United States Patent [19]
Chapin et al.

[11] Patent Number: 5,317,465
[45] Date of Patent: May 31, 1994

[54] NEGATIVE PRESSURE AIR BEARING SLIDER WITH A CHOKE FOR RESTRICTING AIR FLOW

[75] Inventors: Robert E. Chapin, Burnsville; Richard A. Strom, Eagan, both of Minn.

[73] Assignee: Seagate Technology, Inc., Scotts Valley, Calif.

[21] Appl. No.: 46,117

[22] Filed: Apr. 9, 1993

Related U.S. Application Data

[60] Continuation of Ser. No. 867,760, Apr. 13, 1992, abandoned, which is a division of Ser. No. 528,925, May 25, 1990, Pat. No. 5,128,822.

[51] Int. Cl.⁵ .................................. G11B 21/21
[52] U.S. Cl. ....................................... 360/103
[58] Field of Search ................... 360/103, 102, 104

[56] References Cited

U.S. PATENT DOCUMENTS

| | | | |
|---|---|---|---|
| 3,678,482 | 7/1972 | Billawala | 340/174.1 |
| 4,212,044 | 8/1980 | Plotto | 360/103 |
| 4,218,715 | 8/1980 | Garnier | 360/103 |
| 4,225,891 | 9/1980 | Plotto | 360/103 |
| 4,285,019 | 8/1981 | Scott et al. | 360/103 |
| 4,475,135 | 10/1984 | Warner et al. | 360/103 |
| 4,553,184 | 11/1985 | Ogishima | 360/103 |
| 4,555,739 | 11/1985 | LeVan et al. | 360/103 |
| 4,636,894 | 1/1987 | Mo | 360/103 |
| 4,644,641 | 2/1987 | Verdone | 29/603 |
| 4,673,996 | 6/1987 | White | 360/103 |
| 4,700,248 | 10/1987 | Coughlin et al | 360/103 |
| 4,734,803 | 3/1988 | Nishihira | 360/103 |
| 4,802,042 | 1/1989 | Strom | 360/103 |
| 4,870,519 | 9/1989 | White | 360/103 |

FOREIGN PATENT DOCUMENTS

| | | | |
|---|---|---|---|
| 55-105858 | 8/1980 | Japan | 360/103 |
| 59-178648 | 10/1984 | Japan | 360/103 |
| 60-13369 | 1/1985 | Japan | 360/103 |
| 62-110680 | 5/1987 | Japan . | |
| 1-245480 | 9/1989 | Japan . | |

*Primary Examiner*—A. J. Heinz
*Assistant Examiner*—Craig A. Renner

[57] ABSTRACT

A negative pressure air-bearing slider comprises a slider body having a surface with a leading edge, a trailing edge and first and second side edges. First and second raised side rails are positioned along cross rail extends between the first and second raised side rails. The raised cross rail has a leading edge and a trailing edge. A negative pressure cavity extends from the raised cross rail toward the trailing edge and between the side rails. A choke is positioned within the raised cross rail, which widens from the leading edge of the raised cross rail toward the trailing edge of the raised cross rail.

2 Claims, 12 Drawing Sheets

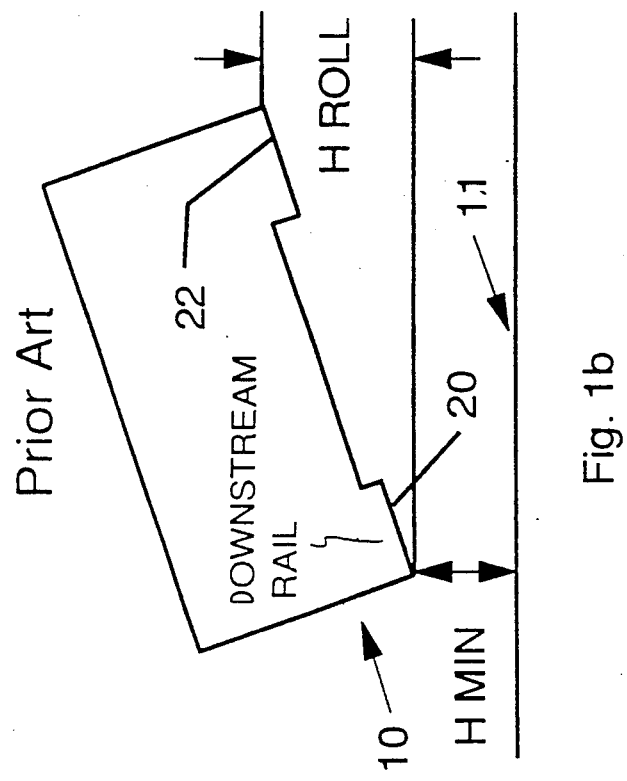
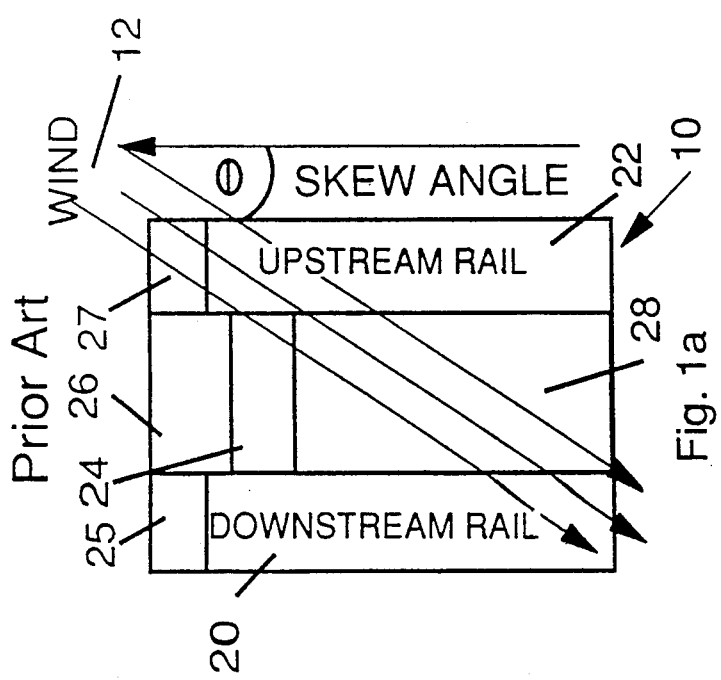
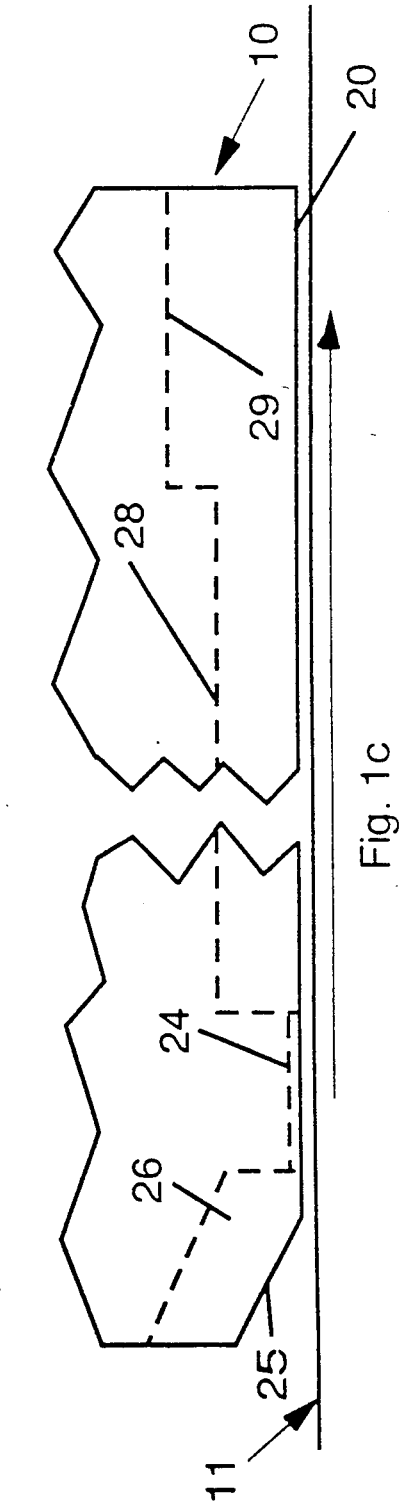

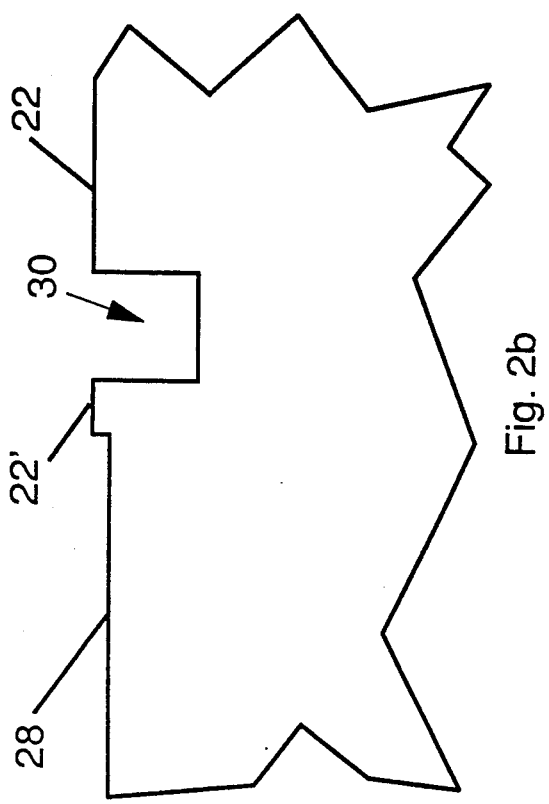
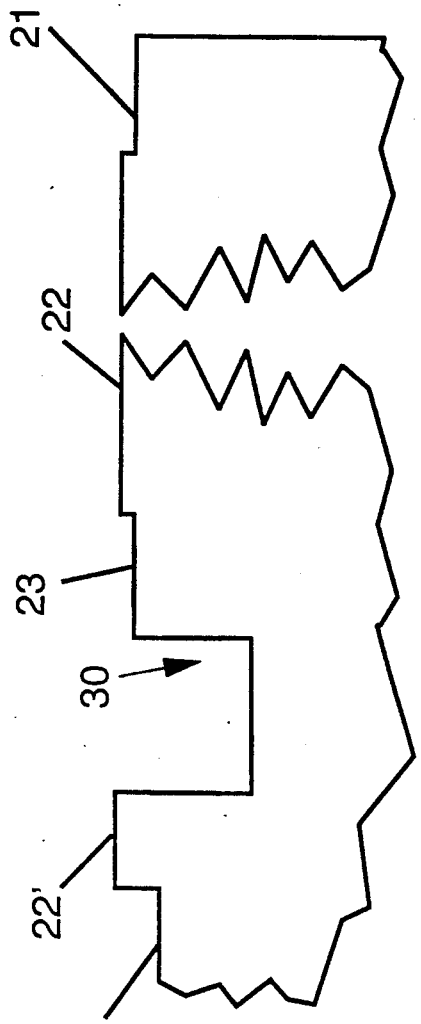
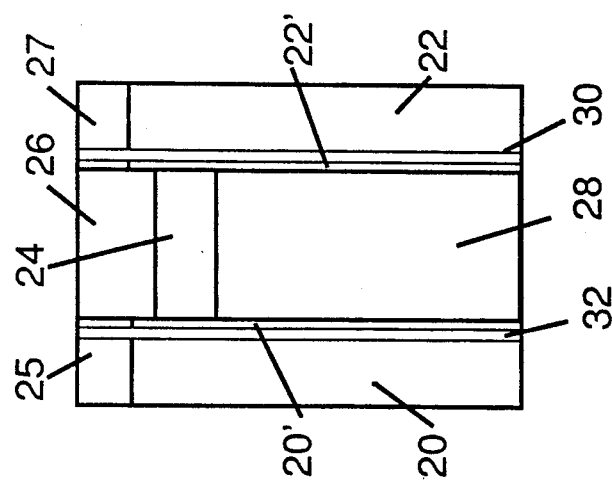

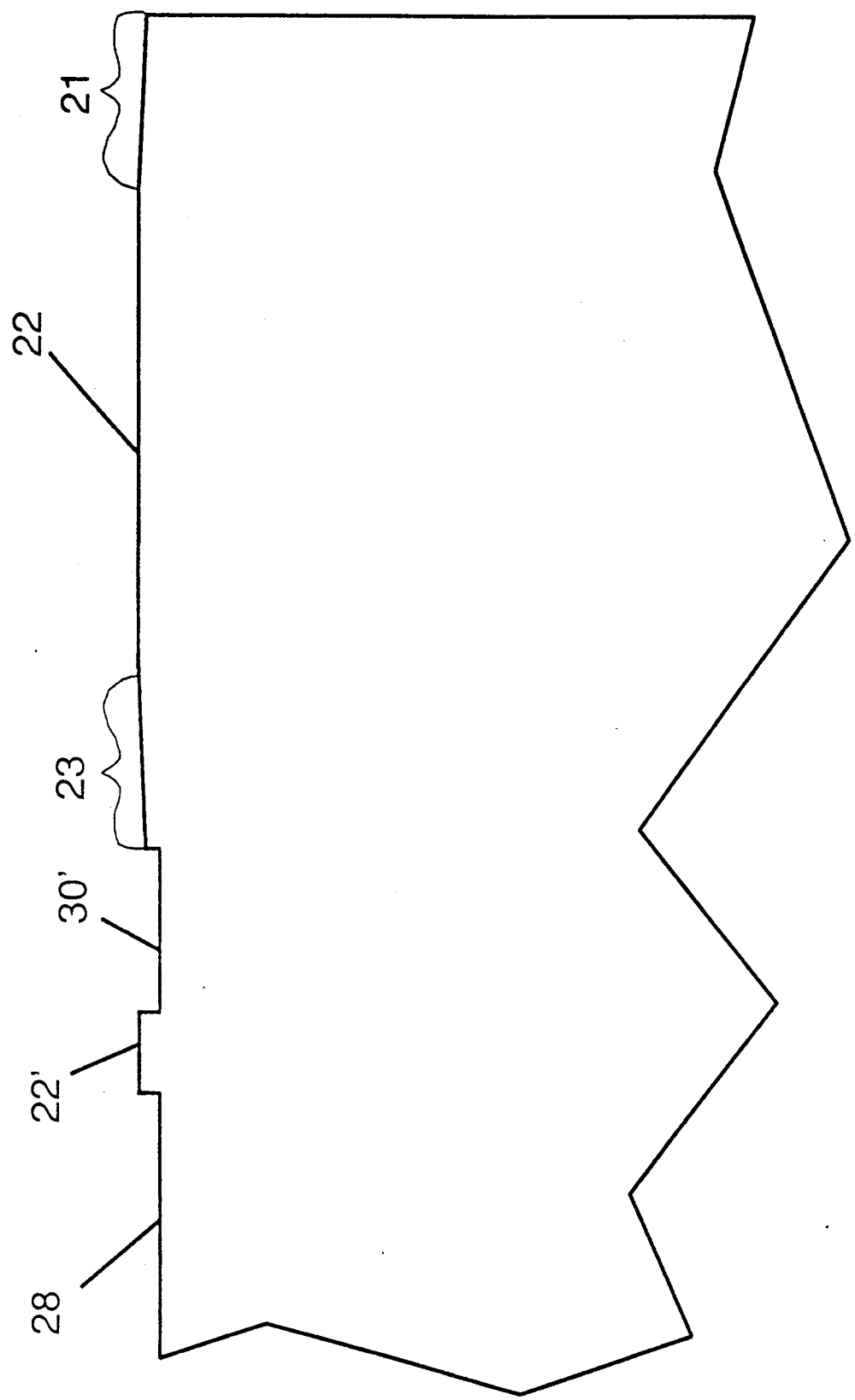

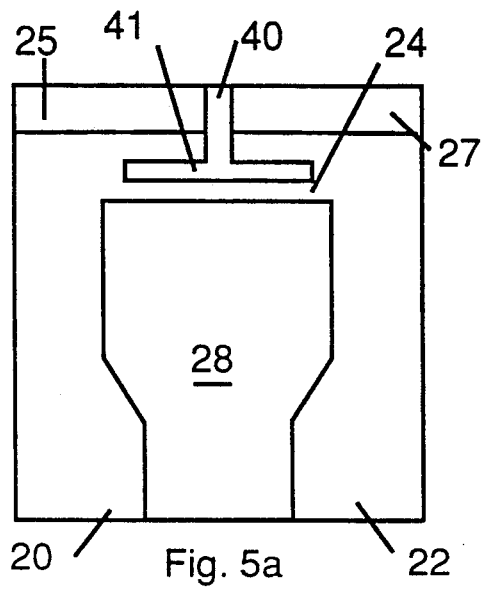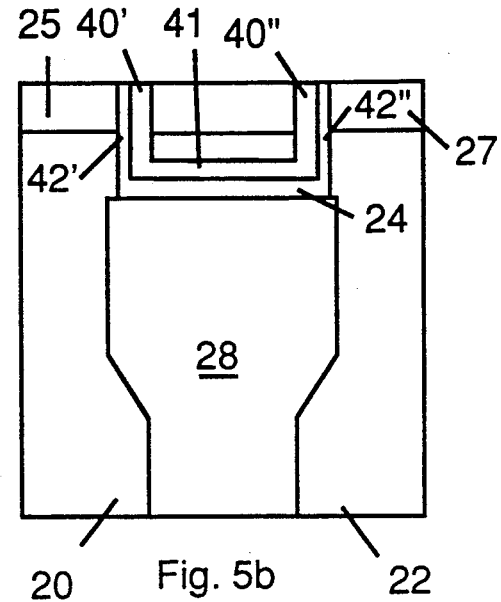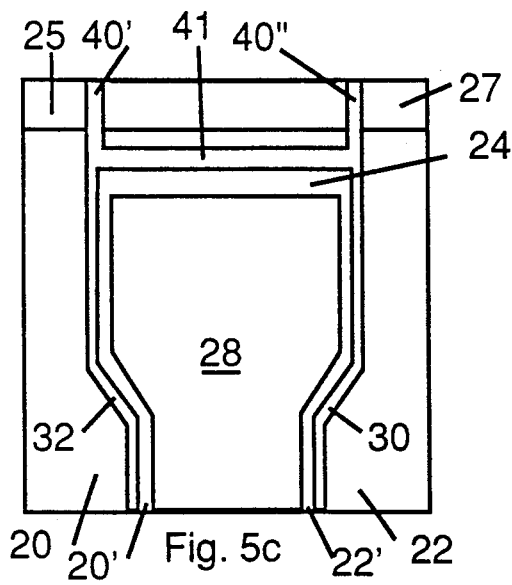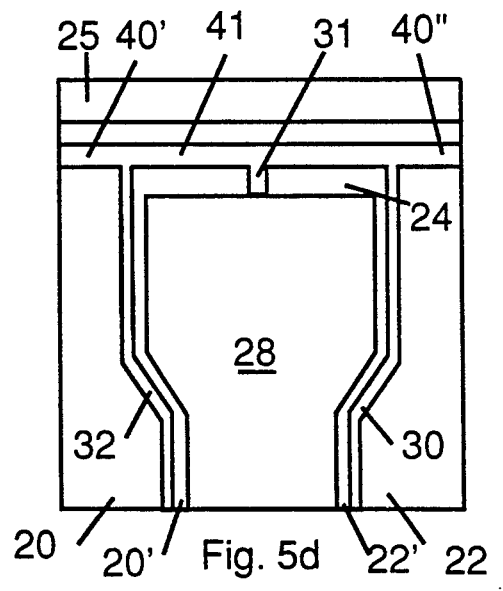

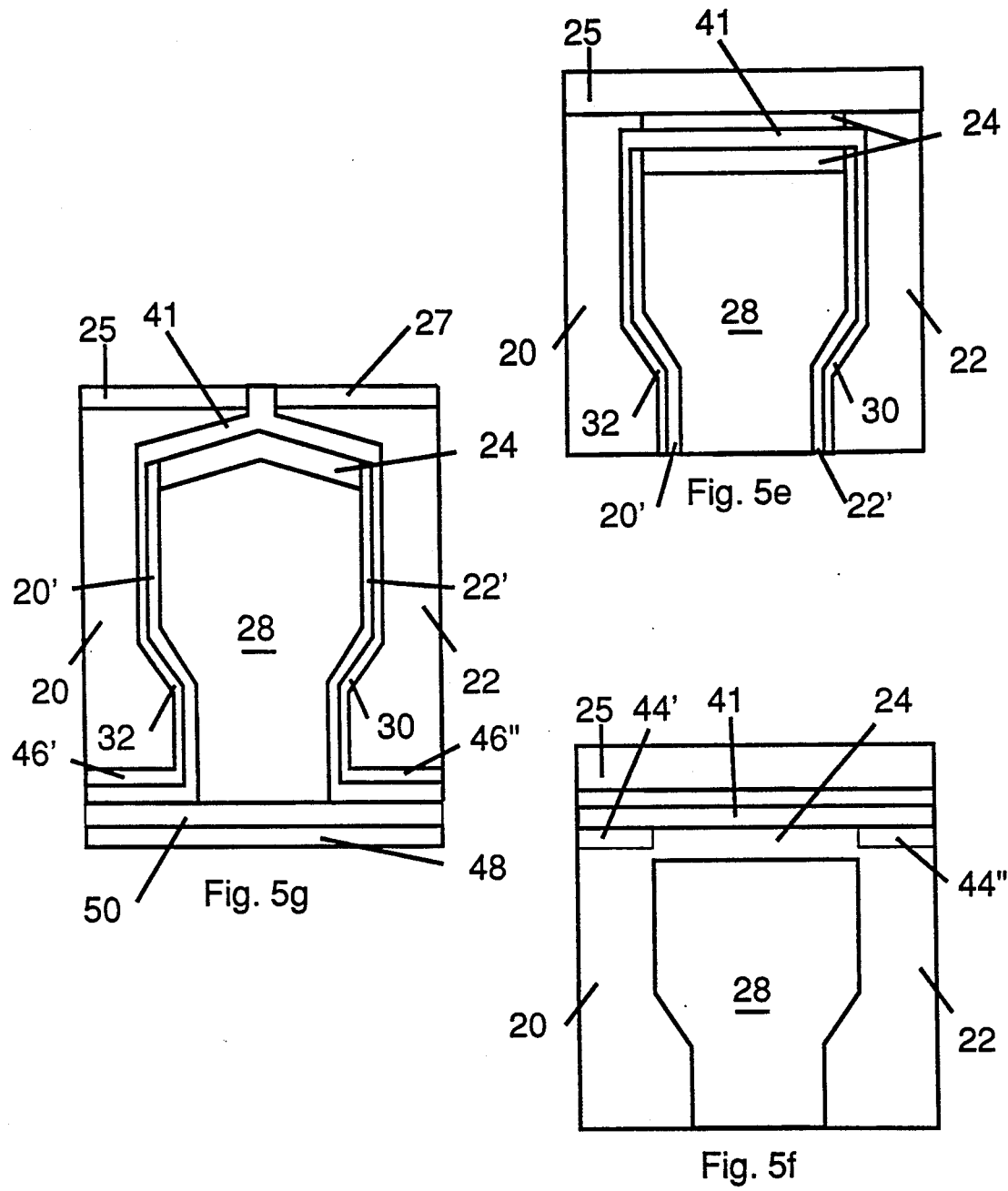

NEGATIVE PRESSURE AIR BEARING SLIDER WITH A CHOKE FOR RESTRICTING AIR FLOW

This is a continuation of application Ser. No. 07/867,760 filed on Apr. 13, 1992, abandoned as of the date of this application, which is a divisional of application Ser. No. 07/528,925 filed May 25, 1990 and issued as U.S. Pat. No. 5,128,822.

BACKGROUND OF THE INVENTION

The invention relates generally to transducer head assemblies for magnetic recording on rotating disk drives, and more particularly to self-loading negative pressure air bearing sliders for use with rotary actuators.

Magnetic head assemblies that fly relative to a rotating magnetic disk have been used extensively. Typically these heads comprise a slider upon whose trailing end a transducer is mounted. Slider designers would like to have the magnetic transducer fly as close to the disk as possible, and have the flying height be uniform regardless of variable flying conditions, such as speed variation from inside track to outside, seeks, and skew caused by rotary actuators. Flying height is viewed as one of the most critical parameters of non-contact magnetic recording.

As disk drives become increasingly compact, rotary actuators with short pivot arms are increasingly employed. However, these actuators increase the difficulty of flying height control because a rotary actuator causes the geometric orientation between the slider fixed to the pivot arm, and the disk rotation tangent, to change as the actuator moves the slider over the disk surface. A measure of this orientation is given by the skew angle 14 as shown in FIG. 1, which is defined as the angle between the slider's longitudinal axis and the direction of disk's tangential velocity. (The "wind" caused by disk rotation is approximately parallel to this tangent.) With the strive towards more compact disk drive packages for applications in smaller more portable equipment, the designer is motivated to use a short actuator pivot arm and thus create rather large skew angles.

However, conventional sliders are very sensitive to skew angle. Even with moderate skew angles in the 10-15 degree range, a conventional slider's fly height and roll angle (defined as the difference in flying height between the inside and outside rails, see FIG. 1b) are adversely influenced.

Increasing the skew angle at a fixed tangential velocity causes the slider pressure distribution to become distorted. This influences the net forces and torque acting upon the slider and results in both decreased flying height and increased roll. Because a transducer is located at the trailing edge of a rail (as is conventional) roll affects transducer performance because of greater flying height variations.

The effect of flying at a skewed angle also extends slider lift off thereby increasing wear and exacerbates the negative effects of rapid seek. Furthermore, conventional sliders are very sensitive to disk surface speeds. With linear actuation (skew angle is a constant 0°), flying height is higher at outer disk radii. While this may be alleviated somewhat with optimized rotary actuator designs, the flying height is still dependent upon disk speed.

A conventional "zero load" or negative pressure air bearing ("NPABN") slider can achieve a flying height substantially independent of disk speeds. However, at skewed conditions, the NPAB exhibits excessive roll and average flying height loss because the downstream rail receives little air from the negative pressure cavity while at the same time the upstream rail is receiving air at ambient pressure.

The art needs a negative pressure air-bearing slider having a near constant, but low, flying height when used in conjunction with short arm rotary actuators and/or with high seek velocities wherein reading from a disk during seek is continued, for example, to read track addresses. Preferably, the slider will exhibit little or no roll over a wide variation in skew angles. The slider would also preferably have rapid take-off but still fly low at full speed.

SUMMARY OF THE INVENTION

The present invention comprises a negative pressure air-bearing slider having reduced skew angle effects. In one configuration isolation channels situated on the inside of the "catamaran" rails of the slider, adjacent the negative pressure cavity, provide air to the downstream rail when the slider is skewed, which increases the pressure at this rail and thereby decreases slider roll.

In one variation, the edges of the rails communicating with the channels are chamfered to provide an air "scoop" when a rail is sliding at skew and is downstream from a channel. The additional air aids in pressurization of the downstream rail.

Additionally, the upstream edges of the rails are similarly chamfered to provide the same effect when a rail is sliding at skew with its upstream edge into the "wind". Increasing pressurization at both the upstream and downstream rail at skew lessens the reduction in overall flying height caused by skew.

The loss of flying height at skew may be further lessened by partially spoiling the negative pressure in the negative pressure cavity in response to skew. In one configuration, angled air channels are provided into the cavity. Air flow into the cavity increases with skew as the channels increasingly align with the direction of slider motion or wind direction.

The use of isolation channels causes the NPAB to have greater sensitivity to flying speed because of the reduced interaction of the positive and negative pressure effects. The increase in flying height at higher disk surface speeds can be lessened either by shortening or widening the isolation channel separating rail near the trailing edge of the flyer. Further improvement can be provided by a centrally positioned island located at the trailing edge of the negative pressure cavity. This island can then be used to mount a centrally positioned transducer.

The spoiler channels may be preferably combined with a divided negative pressure cavity to more greatly reduce negative pressure effects in the downstream cavity. This raises the downstream side of the slider and reduces roll.

Fast take-off is provided by increasing lift at the forward edge of the slider and spoiling negative pressure at low speeds. In a preferred embodiment, the forward lift is provided by extending the area of the forward tapered surface. However, without compensation, a large forward taper causes the slider to fly too high at speed and further is far too responsive to speed variation from inside to outside disk tracks. Compensation is provided by a pressure reduction channel behind the leading taper and in front of the negative pressure cavity cross rail. This "anterior" pressure reduction channel reduces and flattens the response curve of overall flying height versus speed but still provides a faster take-off than conventional designs.

A low speed, negative pressure spoiler is provided by either a choke gap or a resistive flow channel in the cross rail. At low speeds, air traverse the choke or channel in volumes sufficient to spoil the negative pressure. However, at high speeds the spoiler's capacity limitations have a significantly reduced effect on negative pressure.

BRIEF DESCRIPTION OF THE DRAWINGS

FIG. 1a is bottom plan view of a conventional H-shaped NPAB slider and an illustration of the angle defined to be skew angle.

FIG. 1b is an illustration showing, in great exaggeration, roll for a NPAB slider under influence of wind from the direction shown in 1a.

FIG. 1c is a partial side plan view showing a slider riding on an air bearing above a disk surface.

FIGS. 2a-2d are various views of the conventional H-shaped negative pressure air-bearing slider as modified with isolation channels according to the present invention, including in FIG. 2c a deep version of the isolation channel and wherein the rail edges are stepped; and FIG. 2d having a shallow version of the isolation channel and wherein the rail edges are chamfered.

FIG. 5a-5g are bottom plan views of alternative embodiments having fast take-off extended front tapers and anterior pressure reduction channels.

DESCRIPTION OF THE PREFERRED EMBODIMENTS

Figure 3A:
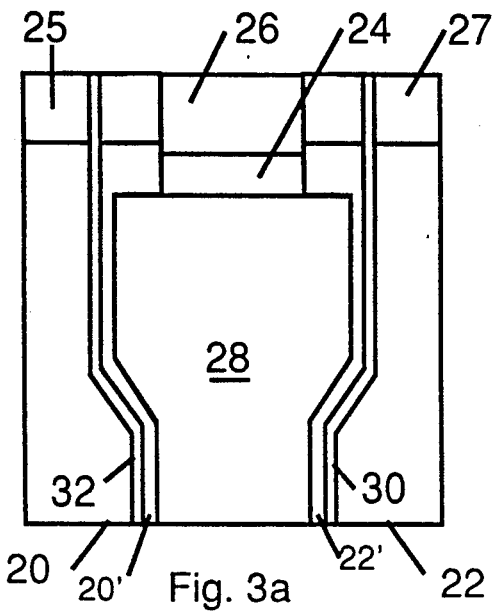
FIGS. 3a-3k are bottom plan views of alternative configurations of a NPAB slider having isolation channels of the present invention.

FIG. 1a is a bottom plan view of a conventional H-shaped NPAB slider 10 flying into wind 12 at an angle $\theta$. The source of the wind is the rotation of the disk surface below the slider, movement of the slider relative to the surface by the disk drive's actuator arm (not shown) during seek, and/or the wind from the sweeping action of the rotating disk surface.

The conventional NPAB slider 10 has two "high pressure" rails 20 and 22 (each of which has a leading taper 25, 27 respectively for funnelling air under the rails) a cross rail 24, a negative pressure cavity 28, and a leading cavity 26.

With the wind impacting the slider 10 as shown in FIG. 1a, leading (or upstream) rail 22 remains pressurized, but to a lesser extent than when the slider 10 is flying directly into the wind with a skew angle of 0°, both because of the shortened rail length relative to the direction of motion and because of the diminished effect of the forward tapers which act as "scoops" to funnel air under the rails. As the negative pressure cavity does not permit air to traverse laterally to the trailing (or downstream) rail 20, much less air reaches this rail for pressurization. The net result is that the leading rail 22 drops slightly, the trailing rail 20 drops even more and entire slider 10 f lies at a reduced height.

FIG. 1b shows slider roll in great exaggeration. Normally, slider 10 will fly about eight microinches off the disk surface 11 with each rail 20, 22 about the same distance from the disk surface 11. If the slider's motion relative to a disk tangent is skewed ($\theta > 0°$ or $\theta < 0°$), the conventional slider rolls. A two micro inch difference in flying height between the trailing and leading rails 20 and 22 is considered to be a large roll.

In FIG. 1b, H ROLL is the difference in flying height of the two rails 20 and 22, and H MIN is the flying height of the lowest rail (in this case rail 20). Significantly, when slider 10 rolls, H MIN also decreases from its value when there is zero roll. If H MIN decreases too much, not only is transducer performance affected, but the head could "crash", causing catastrophic failure.

FIG. 1c is a partial side plan view of the slider 10 flying close to disk surface 11. As stated above, typical flying heights are eight microinches.

The conventional H-shaped slider 10 has a leading cavity 26, which is preferably made deep, and which may be a cut through the whole slider body. This leading cavity 26 reduces the flying pitch of the slider 10 and thereby the height to which it would otherwise fly.

Just aft of the leading cavity 26 is a cross rail (or cross bar) 24. The cross rail 24 is preferably recessed slightly (by about forty microinches from the level of the rails 20, 22. This prevents small particles of debris from collecting in the leading cavity 26. The recess in the cross rail 24 slightly reduces the negative pressure effectiveness of the negative pressure cavity 28. However, it also allows some air into the negative pressure cavity 28 on take-off to reduce the negative pressure holding the slider 10 to the disk surface 11.

The use of the recessed cross rail 24 is optional. It has been included as an example in several of the embodiments that follow in the Figures. The importance of a recessed cross rail is not a requirement for obtaining the beneficial effects of the other features described.

Typically, the negative pressure cavity 28 will be a recess 350 microinches deep from the level of the rails 20 and 22. The conventional slider body is typically 0.125" wide, 0.160" long and 0.034" high. The leading tapered edges 25 and 27, taper to a depth of 200 microinches from the level of the rails 20, 22. Each rail 20, 22 is approximately 0.026" wide and the cavity 28 is 0.071" wide at the cross rail 24. Unless otherwise mentioned, the dimensions of the sliders of the preferred embodiments are generally similar to the dimensions of the conventional H-shaped NPAB slider 10 of FIGS. 1a-1c. It should be noted that the slider dimensions can be scaled up or down to achieve larger or smaller sliders with similar characteristics.

FIG. 1c also shows a feature which is not found in the prior art: a step 29 in cavity depth of cavity 28. This feature will be discussed in more detail later.

The first embodiment of the present invention is shown in FIGS. 2a-2d. Isolation channels 30 and 32 extending from the forward edge of the slider to the trailing edge are located adjacent to the inside of the positive pressure rails 20 and 22 and provide a source of near ambient pressure air along their length. When a slider is flying at a skewed angle, the trailing rail 20 draws air from channel 32 to pressurize and lift the slider on the downstream side, thus reducing roll. Located between channels 30 and 32 and negative pressure cavity 28 are separating rails 22' and 20', respectively.

FIG. 2b is a detailed cross section showing rail 22, isolation channel 30, separating rail 22' and negative pressure cavity 28. The channels 30 and 32 are made relatively deep and wide (e.g., 0.004"×0.004") in order to provide as little pressure drop along their length as possible,.

FIG. 2c shows a similar cross section of rail 22, isolation channel 30, cavity 28 and the isolation channel separating rail 22' separating the isolation channel from the cavity. In the embodiment of FIG. 2c the edges of the rails include steps 21, 23 for easing the transition of air from a rail edge to the rail itself. These optional edges are preferably chamfered as shown in the embodiment of FIG. 2d. However, processing chamfered edges is difficult, while steps can be formed from conventional processes such as ion milling.

The inside step 23 eases the transition of air from the channel 30 to the rail 22 when the channel is "upstream" from the rail and aids in pressurization along the entire length of the rail. Step 21 similarly aids in pressurization of the rail 22 along its entire length when it is flying upstream to the rail (into the wind).

In FIG. 2c, rail 22 is 0.02" wide, channel 30 is 0.004" wide, and isolation channel separating rail 22' is 0.002" wide. The key feature of the isolation channel separating rail 22' is that it have sufficient width to isolate the cavity 28 from the channel 30, but not be sufficiently wide to act as a rail itself.

FIG. 2d is a similar cross-section of an alternative relatively shallow isolation channel 30'. Because of the shallow depth, the air pressure along the channel 30' increases above ambient fore to aft. Unlike the deep channel 30 of FIG. 2c (which has near ambient pressure along its length), in FIG. 2d the shallow channel air pressure will be a complex function of flying speed and skew angle an well as position (along its length). Nevertheless, the shallow channel 30' provides a similar benefit of reducing roll and loss of flying height over a range of skew angles.

Also, the isolation channel 30' and steps or chamfers may not necessarily have constant width or depth along their length. It should be noted also that the negative pressure cavity 28 need not be a constant depth. The cavity depth may be stepped as at 29 of FIG. 1c (which is not prior art) or tapered in a variety of configurations to alter the negative pressure characteristics. These are variables the designer can manipulate for a specific application to provide custom flying performance.

In FIG. 2d, rail 22 is 0.02" wide, channel 30' is 0.004" wide, and isolation channel separating rail 22' is 0.002" wide. The depth of channel 30' is approximately the same depth as negative pressure cavity 28 (i.e., 350 microinches in the preferred embodiment). The chamfers 21 and 23 are each approximately the same width as channel 30' (0.004"), and taper to a depth of about 40 microinches in the preferred embodiment.

FIGS. 3a-3k show alternative isolation channel embodiments. In FIG. 3a, both the width of the leading cavity 26 and the trailing portion of the negative pressure cavity 28 are reduced, with corresponding expansions of the leading taper and trailing rail widths. This configuration provides for faster take-off, but the large trailing rails and smaller trailing negative cavity reduce pitch and reduce the increase in flying height at higher speeds.

Figure 3B:
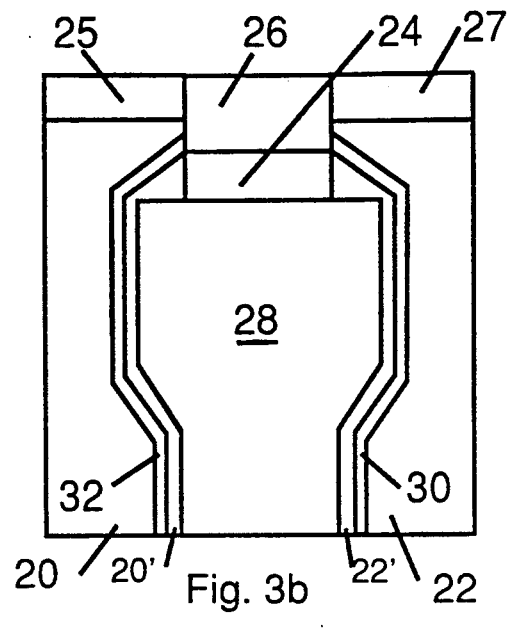

In FIG. 3b, the isolation channels 30 and 32 are angled into and intersect the leading cavity 26. As skew increases, air flow into the channel 30 or 32 more aligned with the direction of motion increases, while air flow into the other decreases. The net result is that more air is available to pressurize the trailing rail thus reducing roll.

Figure 3C:
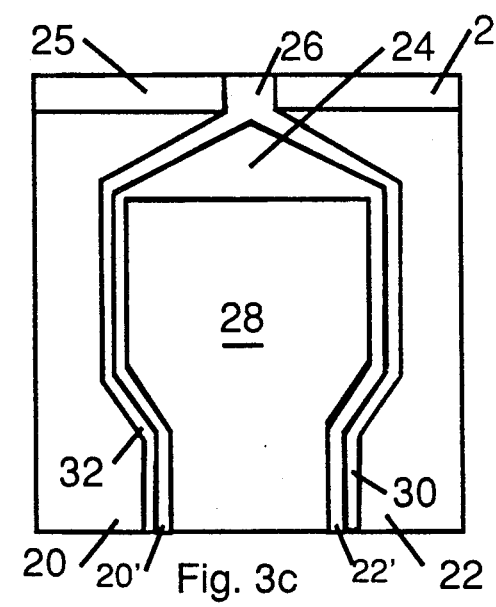

In FIG. 3c, the leading cavity 26 is even further reduced and the cross rail 24 is made arrowhead shaped to enhance the funneling effect of air into the downstream isolation channel. Moreover, the increased frontal area provides greater lift, especially on take-off.

Figure 3D:
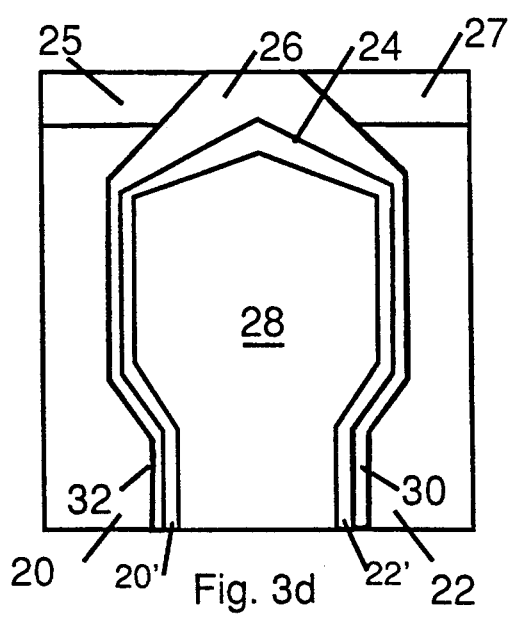

In FIG. 3d, the size of the cross rail is reduced from FIG. 3c so that it is now "V" shaped and the isolation channels 30 and 32 are widened to consume the entire leading cavity or recess. This design reduces over-pressure at the leading edge during high speed operation, increases the air flow into the downstream isolation channel and thus the skew compensation and further increases the size of the negative pressure cavity 28 for lower flying height.

Figure 3E:
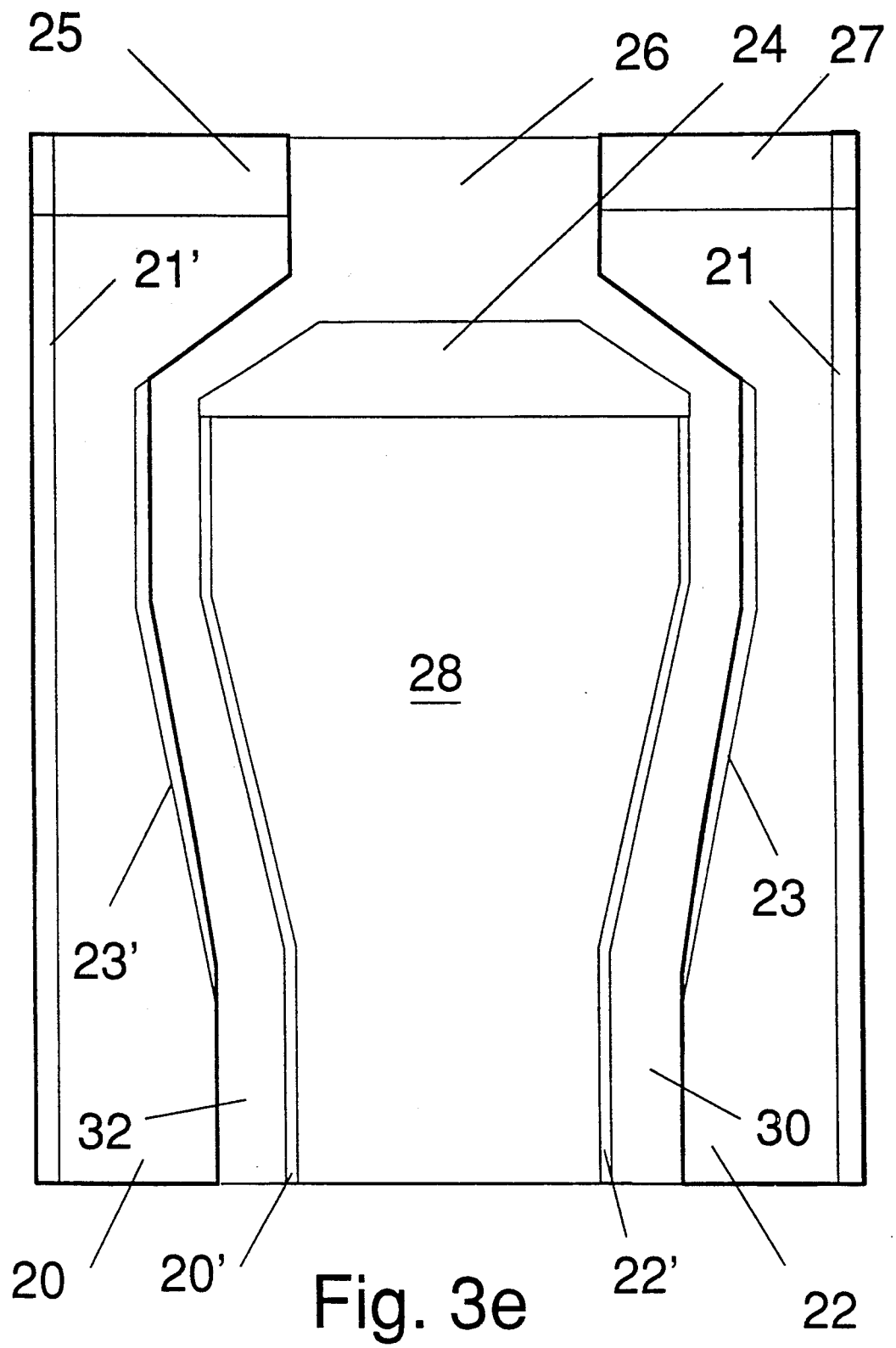

FIG. 3e is similar to FIG. 3b, however here the entire cross rail 24 is recessed. Further, isolation channels 30 and 32 are shallower, and broader than the isolation channels shown in FIG. 3b. Thus their capacities are increased so that they provide an adequate source of air to pressurized rails 20 and 22. Furthermore, the rails include edge steps (or tapers) 21 and 21' and 23 and 23' to ease pressurization at skew as discussed above. A key feature of this design is that the negative pressure cavity 28 and isolation channels 30 and 32 are approximately the same depth so that they may be formed during a single ion milling step. As well, cross rail recesses 24 and steps 21, 21', 23, and 23' are approximately the same depth so that they may be formed during a single ion milling step.

In FIG. 3e, the overall length and width of the slider is 0.160"×0.121". The outside edge steps 21 and 21' are 0.004" wide. The inside steps 23 and 23' are 0.002" wide. The isolation channels 30 and 32 are 0.006" wide. The isolation channel separating rails 20' and 22' are 0.002" wide. The negative pressure cavity 28 at its forward end is 0.066" wide, and at its trailing end is 0.589" wide. The leading edge taper 25, 27 is 0.014" wide. The length and width of the leading cavity 26 is 0.589"×0.031". The length of the cross rail 24 at its leading edge is 0.040", and its length at its trailing edge is 0.070"; its width is 0.013". The distance from the leading edge to the first channel bend is 0.070", and to the second bend is 0.125". The depth of the steps 21, 21', 23 and 23' and cross bar 24 recess is 40 $\mu$".

Figure 3F:
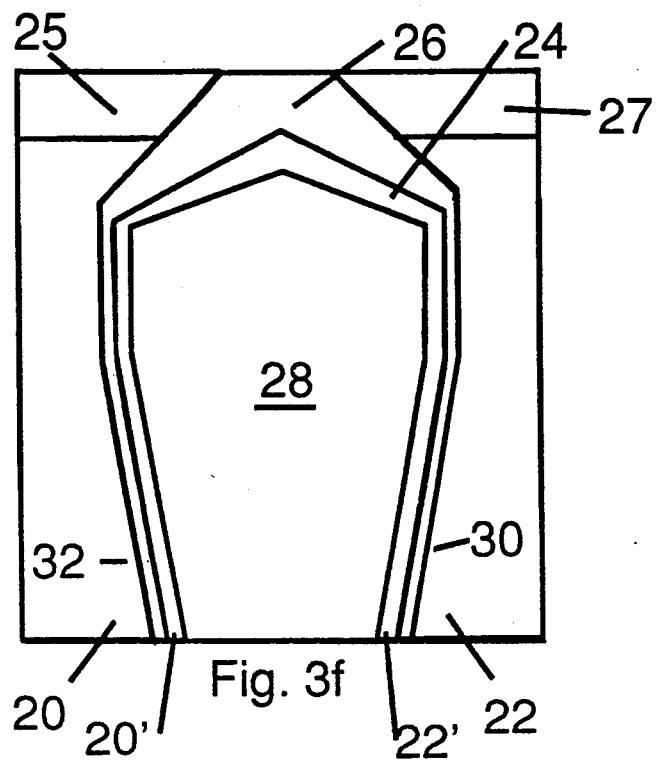

FIG. 3f is a design similar to that of FIG. 3d with straight-angled isolation channels 30 and 32. The straight-angled channels are provided by removing the final outward bend therein. The longer angled inside edge of the downstream rail is more effective in pressurizing the air supplied by the adjacent isolation channel 30 or 32, thus improving the roll compensation versus skew angle.

Figure 3G:
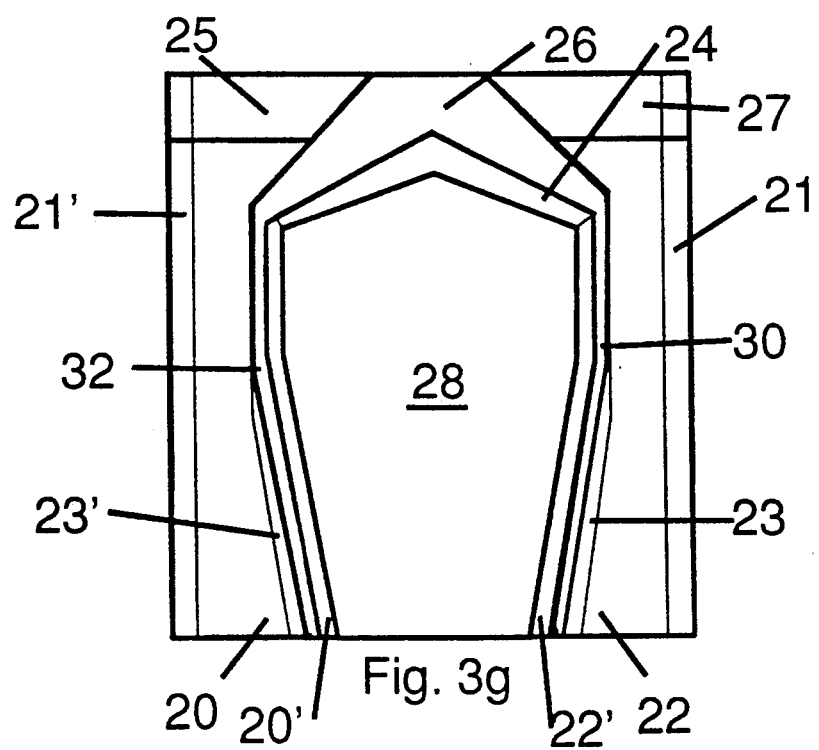

FIG. 3g is a design similar to that of 3f with the addition of a recess to cross rail 24, steps 23 and 23' along the trailing portions of rails 22 and 20 respectively, and steps 21 and 21' in the outside edges of the rails. The steps further improve the pressurization of the downstream rail. The recess in the cross rail 24 reduces the chance of debris collection at the cross rail 24 and further aids in breaking the negative pressure cavity 28 vacuum at take-off.

Figure 3H:
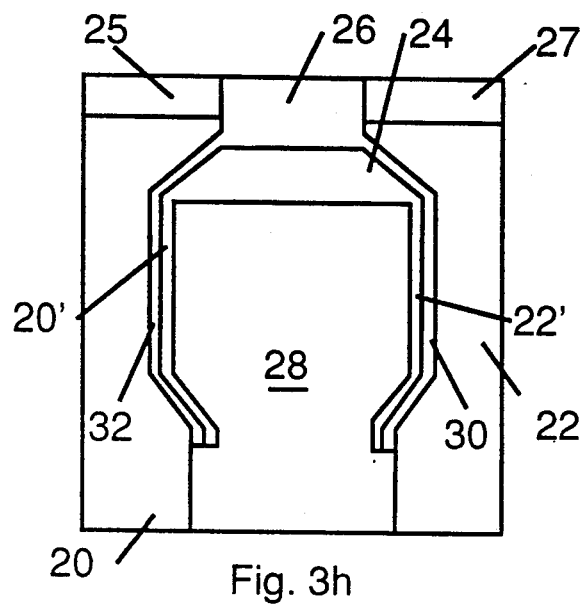
Figure 3I:
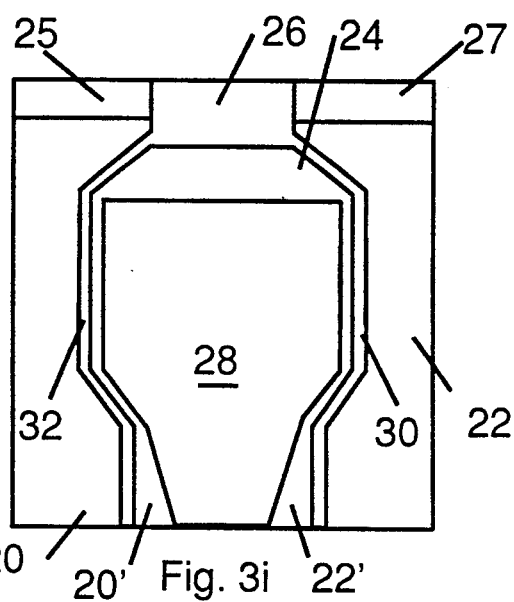
Figure 3J:
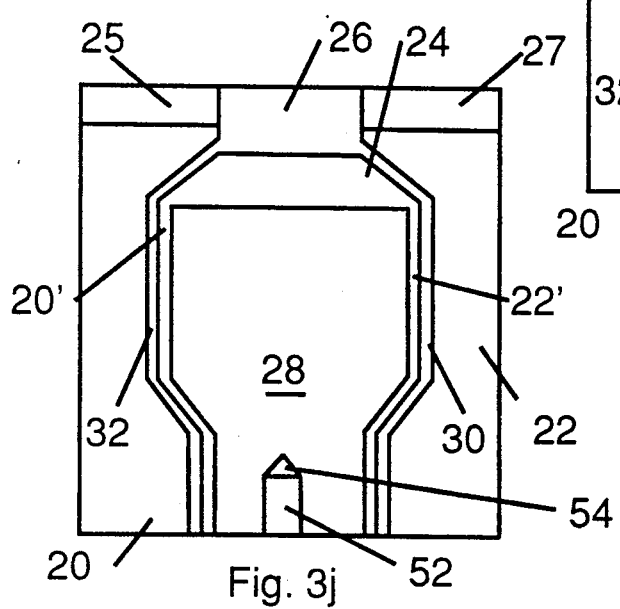

FIGS. 3h-3j show alternative isolation channel arrangements designed to reduce the flying height sensitivity of the flyer to increased disk speed.

In FIG. 3h, the isolation channels 30 and 32 do not extend the full length of the rails 20 and 22, but instead terminate and communicate with the negative pressure cavity 28. An increase in flying height at higher speeds can be lessened by shortening the isolation channel separating rails 20' and 22'. This allows greater interaction of the positive and negative pressure effects.

In FIG. 3i, the isolation channel separating rails 20' and 22' are widened at the trailing end of the negative pressure cavity 28 to provide greater lift there.

In FIG. 3j, an island 52, is formed in a center region of the negative pressure cavity 28 adjacent the trailing edge of the cavity. The island 52 is substantially the same height as the rails 20 and 22. A tapered or stepped forward end 54 increases pressurization of the island 52. The island 52 improves the flying characteristics of the slider by reducing fly height variation. Preferably, the slider has a near flat flying profile between an inner and an outer radius of the disk. In other words, the slider preferably flies at substantially the same height above the disk surface 11 (shown in FIG. 1c) at the inner radius as it flies at the outer radius. However, the velocity of the air being dragged between the slider and the disk at the inner radius is less than the velocity at the outer radius. As a result, the positive pressure that builds along the rails 20 and 22 is less at the inner radius than at the outer radius causing the slider to fly lower at the inner radius than at the outer radius.

The island 52, however, reduces the effects on flying height caused by changes in the air velocity. At low speeds, the air traveling beneath the island 52 pressurizes the island and produces lift at the trailing edge of the slider. This lift increases the fly height at the inner radius of the disk. At high speeds, the effective pressure on the island 52 is diminished, relative to the increasing effects of the negative pressure cavity 28. Therefore, the island 52 has almost no effect on fly height at the outer radius of the disk. The overall result is a flatter flying profile between the inner radius and the outer radius of the disk. The fly height variation is further reduced by positioning the transducer on the island 52 since the island is generally coincident with a roll axis (not shown) of the slider.

Figure 3K:
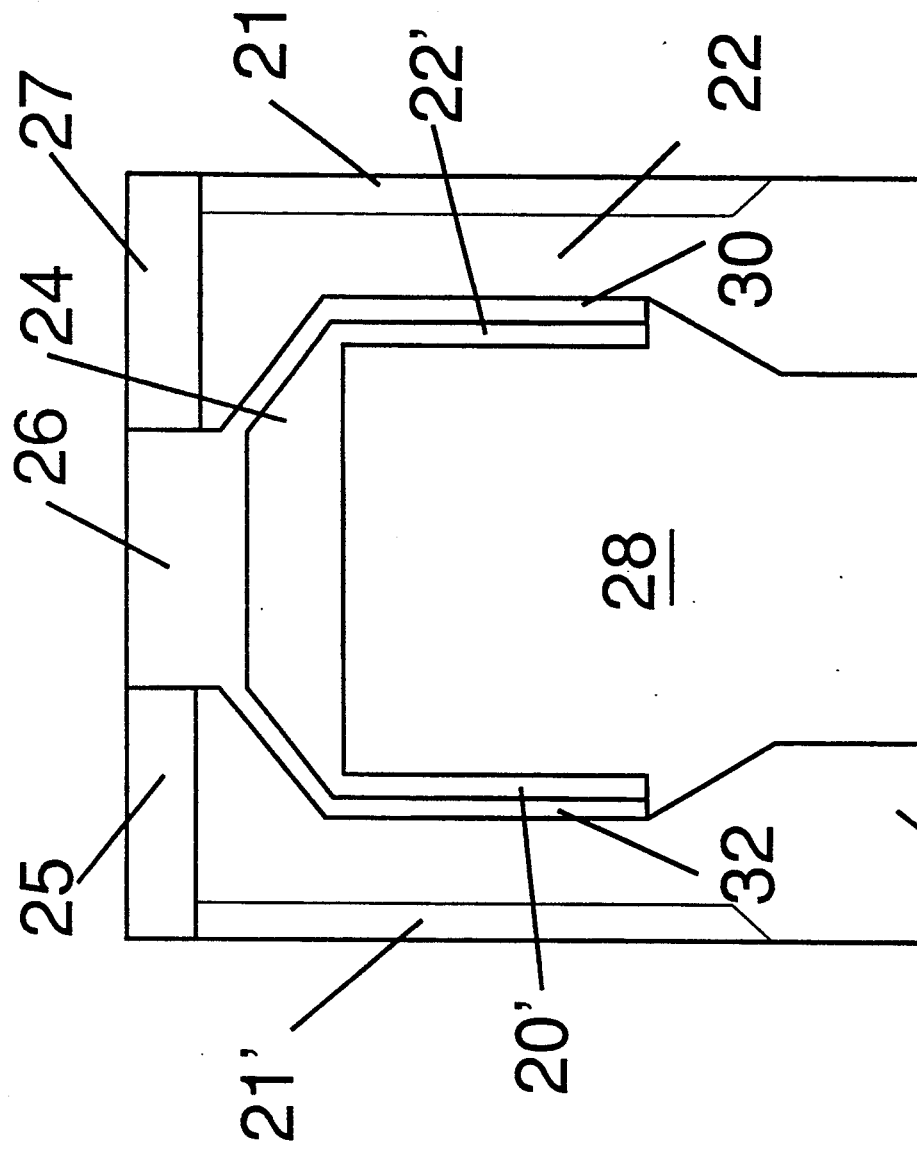

FIG. 3k shows isolation channels 30 and 32 terminating generally adjacent to side rail break points. The break points are where side rails 20 and 22 begin to broaden toward the trailing edge of the slider. The isolation channels 30 and 32 shown in FIG. 3k are shorter than those shown in FIG. 3h and allow for greater interaction of the positive and negative pressure effects to further decrease flying FIG. 3k also shows the edge steps 21 and 21'. However, unlike FIG. 3e, steps 21 and 21' do not extend the full length of the rails 20 and 22 but terminate generally adjacent to the side rail break points. The terminated edge steps 21 and 21' ease pressurization of the rails at skew and provide a large rail surface area near the trailing edge. Increasing the rail surface area near the trailing edge increases pressure on rails 20 and 22 during flight. The increased pressure stabilizes slider flight and provides a constant flying height through varying skew angles.

FIGS. 4a–4f illustrate selective spoiling of the negative pressure in cavity 28 to both shorten take-off and compensate for skew effects.

Figure 4A:
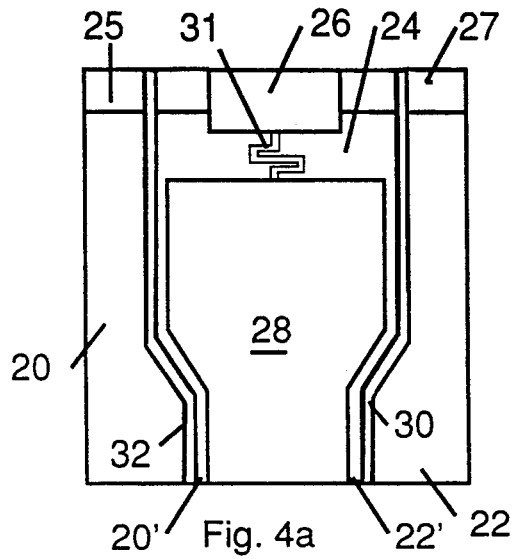
FIGS. 4a-4f are bottom plan views of alternative embodiments of the present invention having a take-off assist spoiler and either isolation channels or a divided negative pressure cavity, (FIG. 4f has both).

FIG. 4a illustrates the basic spoiler concept. Here a circuitous, spoiler channel 31 is formed in cross rail 24 to communicate air between leading cavity or recess 26 and cavity 28. Spoiler channel 31 functions similarly to a recessed cross bar in reducing take-off speeds. The air flow through the spoiler channel 31 is proportional to the pressure difference across the cross bar 24. The dimensions of the spoiler channel 31 must be chosen so that there will not be a large reduction in the negative pressure within the cavity 28 at higher flying speeds. Skew compensation is provided by isolation channels 30 and 32.

Figure 4B:
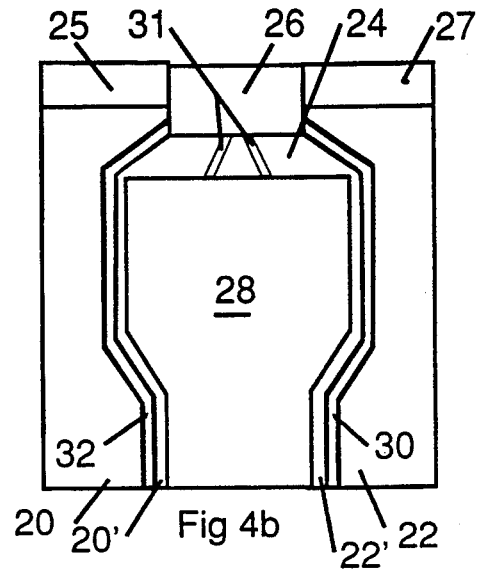

Another variation of the negative pressure spoiler is shown in FIG. 4b. Here the spoiler channel 31 is slit into two angled segments. The effect of these angle channel segments increases when flying at positive or negative skew angles. These spoiler channels 31 help reduce the overall loss of flying height when flying at skew angles. Isolation channels 30 and 32 are angled into leading cavity 26 and perform in a similar fashion to those described for FIG. 3b.

Figure 4C:
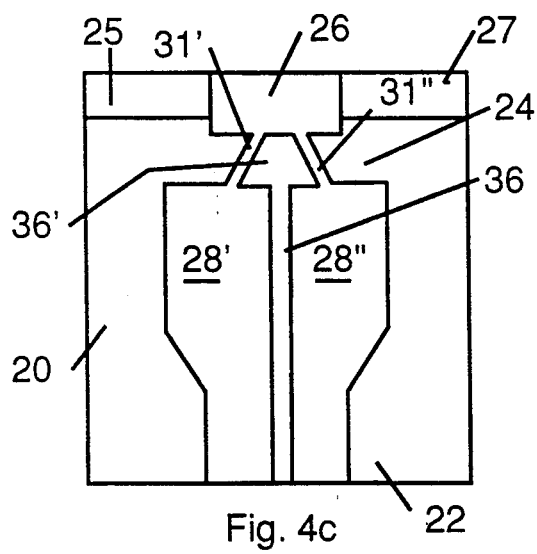

FIG. 4c additionally provides a negative pressure cavity divider bar 36 whose head 36' is arrow-shaped to provide two angled spoiler channels 31' and 31" leading to negative pressure cavities 28' and 28" respectively. Spoilers 31' and 31" assist in breaking negative pressure on take-off, and the angles retard air entry into the cavities 28' and 28" at speed. However, when the slider flies at a skew angle, one of the spoiler channels will begin to line up with the direction of motion and more air will enter the corresponding downstream cavity, thereby reducing negative pressure effects in that cavity. Correspondingly, the other spoiler channel will become less aligned with the direction of motion and less air will spoil the negative pressure in the upstream or leading cavity thereby increasing its negative pressure effects. Overall negative pressure effect will be approximately the same, however, the tendency of the slider to roll with the leading rail high will be lessened by the increased negative pressure in the leading cavity and the reduced negative pressure in the trailing cavity.

Figure 4D:
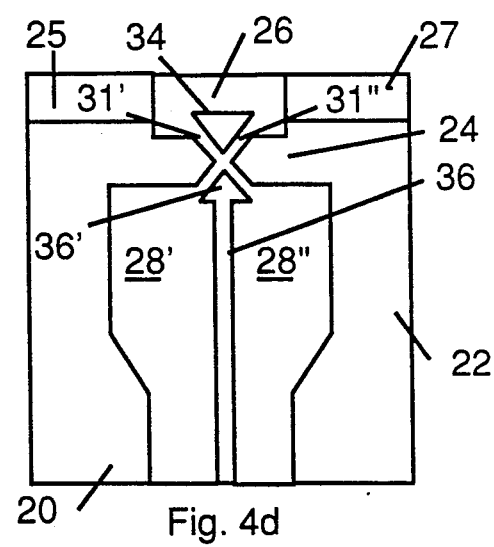

FIG. 4d shows another variation on the same theme. Here the divider bar 36 is slightly shortened and a leading triangular block 34 is added. Block 34 acts to reduce spoiling air flow into cavities 28' and 28" with no skew to a greater extent than the design of FIG. 4c. Spoiler channels 31' and 31" are now crossed. Air flows through the crossed spoiler channels 31' and 31" in a generally constricted manner as with the other spoiler channels. However, when one of the channels becomes more aligned with the direction of motion, the flow therethrough increases while flow simultaneously decreases in the other channel. With better alignment, overall flow increases into the downstream negative pressure cavity, 28' or 28". With appropriate dimensions, the crossed spoiler channels 31' and 31" can be made to function as a fluidic-type device whereby the differences in the quantity of air flow to the divided cavities 28' and 28" can be greatly enhanced providing a greater amount of slider roll compensation.

Figure 4E:
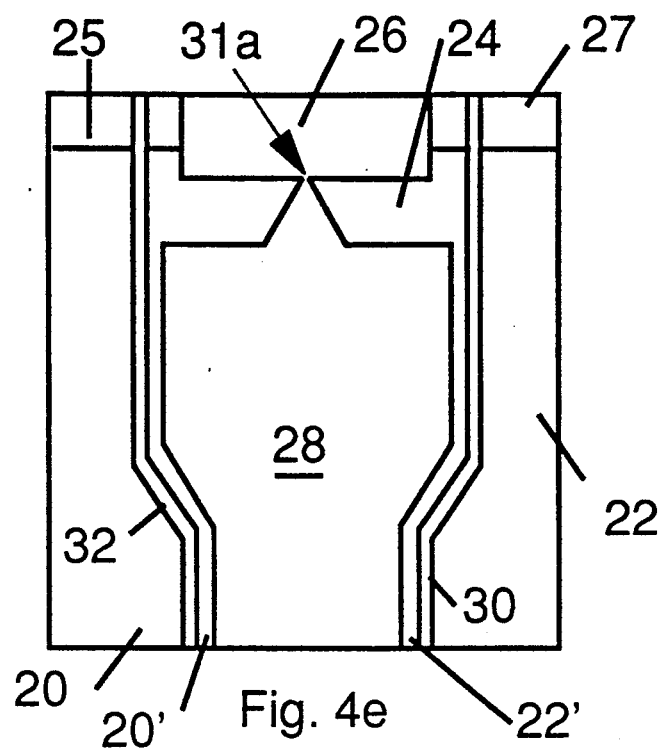

FIG. 4e shows an alternative-spoiler design. Here a choke 31a is employed which passes air at low speeds but which causes air flow to approach a constant at higher flying speeds when the speed of the air within the choke 31a approaches sonic velocities. Thus, the primary spoiling effect of air through the choke 31a occurs at low speed. This improves the take-off characteristics at low speeds without spoiling the negative pressure as much at higher speeds.

Figure 4F:
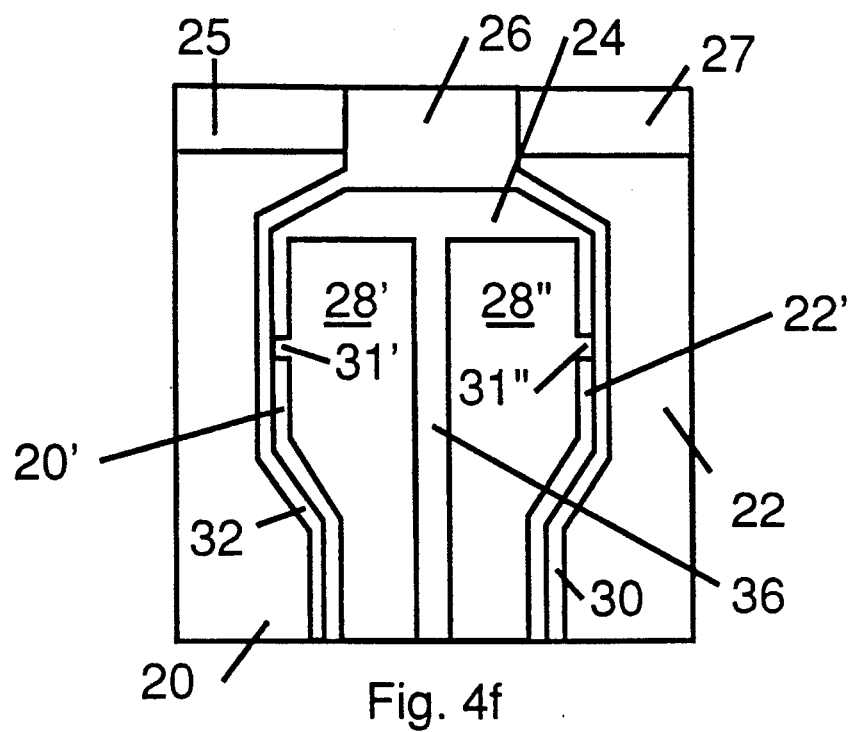

FIG. 4f shows an alternate spoiler channel location when isolation channels 30 and 32 are included. The spoiler channels 31 may be located to communicate through the isolation channel separating rails 22' and 20' between the negative pressure cavity 28 and the isolation channels 30 and 32. Here the negative pressure cavity is divided into two cavities 28' and 28" and the isolation channels 30 and 32 are inclined into the leading cavity 26. At skew, the pressure in the downstream isolation channel increases, thereby increasing the spoiling effect of the downstream cavity. Thus, roll is decreased by having relatively greater negative pressure in the upstream cavity. This design has some similarities to the design in FIG. 4b. Here the spoiler channels 31' and 31" are moved around to the sides and a divider bar 36 is added.

FIGS. 5a–5g illustrate several variations of a highly enlarged leading edge taper section 25, 27 which increase lift to provide for shorter take-off. Each variation includes a pressure reduction channel 41 anterior the cross rail to both reduce the over pressure of the leading taper at speed and also to maintain a high degree of negative pressure in cavity 28.

FIG. 5a illustrates the basic concept. A broad leading taper 25, 27 is provided. Just aft of the leading taper and anterior a negative pressure cavity 28 pressure relief channel 41 is provided. Preferably, this channel connects to ambient air pressure to vent air flowing past the leading taper 25, 27. In FIG. 5a, the vent is provided by channel 40 leading to the forward edge of the slider.

The pressure relief channel anterior the negative pressure cavity prevents air scooped up by the leading taper from entering the negative pressure cavity 28 to spoil the negative pressure. This results in a slider that has both good take-off characteristics and low flying height. It has also been found to have a relatively constant flying height versus speed, a desirable property, and a higher flying height at low speeds than a conventional NPAB slider.

FIG. 5b illustrates a variation which provides two lateral access channels 40' and 40" from the leading edge of the slider to the anterior pressure relief channel 41. Additional edge steps or tapers 42' and 42" communicating between the leading sections of rails 20 and 22 and the access channel 40' and 40" act, in conjunction with access channels, to provide air to the leading portion of the downstream or inside rail at skew. Cross rail 24 is shown recessed in this design. The effect is similar to a limited isolation channel and may be particularly useful for sliders having only small skew angle variations.

FIG. 5c illustrates a variation which provides two lateral access channels 40' and 40" from the leading edge of the slider to the anterior pressure relief channel 41. These access channels are in turn connected to isolation channels 30 and 32. This design provides a high degree of skew compensation with good take-off and flying height properties.

FIG. 5d illustrates a variation which provides two lateral access channels 40' and 40" communicating between the pressure relief channel 41 and the side edges of the slider. These channels are in turn connected to isolation channels 30 and 32. This design provides pressure reduction along the entire length of the leading taper 25, including in front of rails 20 and 22. As well, an optional spoiler channel 31 connects from the anterior pressure relief channel to the negative pressure cavity 28 to assist in take-off as above described.

In this design, the frontal area of the leading taper 25 is maximized for fast take-off while the isolation channels provide skew compensation. The presence of pressure relief channel 41 in front of rails 20 and 22 reduces their effectiveness slightly so that high speed over-pressure from the large leading taper 25 is reduced.

FIG. 5e is another variation which connects the anterior pressure relief channel 41 to ambient air through isolation channels 30 and 32. Here the leading edge 25 frontal area is again maximized for fast take-off, skew compensation is provided by the isolation channels 30 and 32. Pressurized air flowing past the front taper 25 enters the pressure relief channel 41 and exits through isolation channels 30 and 32. At skew, this air tends to preferably flow into the downstream isolation channel, which enhances skew compensation. This design includes a recessed cross bar 24 which increases the air flow in the isolation channels 30 and 32.

FIG. 5f is another variation which provides a single anterior pressure relief channel 41 spanning the slider side edge-to-side edge. Air flowing past taper 25 exits through this channel 41. However, rail edge tapers or steps 44' and 44" connected to the channel 41 help pressurize the rail from this source of air.

FIG. 5g illustrates another variation very similar to that of FIG. 3c. This configuration has the anterior pressure relief channel 41 of FIG. 5a connected to isolation channels 30 and 32. However, the pressure relief channel 41 is angled or V-shaped so that air will tend to flow to the downstream isolation channel (30 or 32) enhancing skew compensation.

At the trailing edge of the slider, the negative pressure cavity 28 vents into channel 50, which communicates with the side edges of the slider. As well, isolation channels 32 and 30 have side vents 46' and 46", respectively. The combination of side vents permits the transducer bearing portion 48 of the head to be a solid rail, which gives more area for transducer elements and eliminates the need to machine-off a portion of the transducer materials during manufacture. This is important for certain machining methods (e.g. laser machining) that cannot remove all of the transducer materials effectively.

The designer will appreciate that the described isolation channels 30 and 32, anterior pressure relief channel 41, leading edge tapers 25, 27, spoiler channels 31, cavity dividers 36, and other particulars herein described, may be selectively combined in other ways to produce a NPAB slider having optimum properties for a given application.

Although the present invention has been described with reference to preferred embodiments, workers skilled in the art will recognize that changes may be made in form and detail without departing from the spirit and scope of the invention.

What is claimed is:

1. A negative pressure air-bearing slider for supporting a transducer proximate a rotating disc, comprising:
   a slider body having a surface with a leading edge, a trailing edge and first and second side edges;
   first and second raised side rails positioned along the first and second side edges, respectively;
   a raised cross rail extending between the first and second raised side rails, the raised cross rail having a leading edge and a trailing edge;
   a negative pressure cavity extending from the raised cross rail toward the trailing edge of the slider body and between the raised side rails; and
   a choke positioned within the raised cross rail and widening from the leading edge of the raised cross rail toward the trailing edge of the raised cross rail, the choke defining a flow restriction which is dimensioned for passing air through the flow restriction at low disc speeds in proportion to a pressure difference across the choke to spoil negative pressure in the negative pressure cavity as the slider takes-off from the disc and is dimensioned for passing air through the flow restriction at a constant flow substantially independent of the pressure difference during acceleration of the disc to higher disc speeds to limit spoiling of negative pressure in the negative pressure cavity at the higher disc speeds.

2. A system for storing and retrieving information, the system comprising:
- a rotating magnetic disc having a recording surface which drags air during disc rotation creating an air flow in parallel with a tangential velocity of the disc rotation;
- a negative pressure air-bearing slider which is carried proximate to the recording surface, the slider comprising:
  - a slider body having a surface facing the recording surface with a leading edge, a trailing edge and first and second side edges, wherein the airflow passes between the recording surface and the slider body surface;
  - first and second raised side rails positioned along the first and second side edges, respectively;
  - a raised cross rail extending between the first and second raised side rails and having a leading edge and a trailing edge;
  - a negative pressure cavity extending from the cross rail toward the trailing edge of the slider body and between the side rails; and
  - a choke positioned within the raised cross rail and widening from the leading edge of the raised cross rail toward the trailing edge of the raised cross rail, wherein the choke defines a restrictive air path which communicates between the leading edge of the raised cross rail and the negative pressure cavity and wherein the restrictive air path is dimensioned for passing the air flow through the restrictive air path in proportion to a pressure difference across the choke as the slider takes-off from the recording surface at low disc speeds and is dimensioned for passing the air flow through the restrictive path at a constant flow substantially independent of the pressure difference after the slider takes-off from the recording surface; and
- a transducer supported by the slider for communication with the recording surface.

* * * * *

UNITED STATES PATENT AND TRADEMARK OFFICE
CERTIFICATE OF CORRECTION

PATENT NO. : 5,317,465

DATED : May 31, 1994

INVENTOR(S) : ROBERT E. CHAPIN, RICHARD A. STROM

It is certified that error appears in the above-indentified patent and that said Letters Patent is hereby corrected as shown below:

Col. 1, line 68, delete "(NPABN"), insert --(NPAB)--

Col. 3, line 68, delete "f lies", insert --flies--

Col. 5, line 4, after "possible", delete comma

Col. 5, line 34, after "angle", delete "an", and insert --as--

Col. 7, line 9, after "52", delete comma

Col. 7, line 49, after "flying", insert --height.--

Col. 8, line 29, delete "leas", insert --less--

Col. 10, line 26, delete "f low", insert --flow--

Signed and Sealed this

Fourth Day of October, 1994

Attest:

BRUCE LEHMAN

Attesting Officer

Commissioner of Patents and Trademarks